(12) United States Patent
Bondu

(10) Patent No.: US 10,029,515 B2
(45) Date of Patent: Jul. 24, 2018

(54) TIRE TREAD FOR HEAVY VEHICLE OF CONSTRUCTION PLANT TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Lucien Bondu, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 155 days.

(21) Appl. No.: 15/106,816

(22) PCT Filed: Dec. 18, 2014

(86) PCT No.: PCT/EP2014/078367
§ 371 (c)(1),
(2) Date: Jun. 20, 2016

(87) PCT Pub. No.: WO2015/091732
PCT Pub. Date: Jun. 25, 2015

(65) Prior Publication Data
US 2017/0001475 A1 Jan. 5, 2017

(30) Foreign Application Priority Data
Dec. 20, 2013 (FR) ...................... 13 63135

(51) Int. Cl.
*B60C 11/00* (2006.01)
*B60C 11/11* (2006.01)
(Continued)

(52) U.S. Cl.
CPC .......... *B60C 11/005* (2013.01); *B60C 1/0016* (2013.01); *B60C 11/11* (2013.01);
(Continued)

(58) Field of Classification Search
CPC .......... B60C 1/0016; B60C 2001/0075; B60C 2001/0083; B60C 11/00; B60C 11/0008;
(Continued)

(56) References Cited

U.S. PATENT DOCUMENTS 1,719,628 A * 7/1929 Sloman .................. B60C 11/00
152/209.5
4,619,300 A * 10/1986 Tokunaga ........... B60C 11/0306
152/209.11
(Continued)

FOREIGN PATENT DOCUMENTS

EP 1 499 507 1/2005
EP 1 682 360 7/2006
(Continued)

OTHER PUBLICATIONS

JP 2009-107435, May 2009, English language machine translation [www.epo.org].*
(Continued)

*Primary Examiner* — Eric Hug
(74) *Attorney, Agent, or Firm* — Cozen O'Connor

(57) ABSTRACT

Tire (1) for a heavy vehicle of construction plant type with tread (2) comprising raised elements (3), separated by grooves (4), extending radially outwards from a bottom surface (5) as far as a contact face (6) over a height (H) and comprising base compound (9) and coating compound (10). Coating compound (10) has a constant maximum thickness ($e_{max}$), at the contact face (6) of each raised element (3), at most equal to 0.15 H, the coating compound (10) has a constant minimum thickness ($e_{min}$), at each groove bottom (8), at least equal to 0.04 H, and the elongation at break at 23° C. $A_{R2}$ of the coating compound (10) is at least equal to 1.05 times the elongation at break of 23° C. $A_{R1}$ of the base compound (9).

7 Claims, 3 Drawing Sheets

(51) Int. Cl.
*B60C 11/13* (2006.01)
*B60C 1/00* (2006.01)
*B60C 11/03* (2006.01)

(52) U.S. Cl.
CPC ... *B60C 11/1346* (2013.01); *B60C 2011/0033* (2013.01); *B60C 2011/0339* (2013.01); *B60C 2200/06* (2013.01); *B60C 2200/065* (2013.01)

(58) Field of Classification Search
CPC ..... B60C 2011/0016; B60C 2011/0025; B60C 2011/0033; B60C 11/0041; B60C 11/005; B60C 11/11; B60C 2200/06; B60C 2200/065; B60C 11/1346
USPC .................................. 152/209.5, 209.15, 905
See application file for complete search history.

(56) References Cited

U.S. PATENT DOCUMENTS 5,840,137 A * 11/1998 Futamura ................ B60C 11/00
152/209.1
2005/0109436 A1 * 5/2005 Bruant .................... B60C 11/00
152/209.1
2006/0157177 A1 * 7/2006 Shimada ............... B29C 47/003
152/209.5

FOREIGN PATENT DOCUMENTS

| | | | | |
|---|---|---|---|---|
| EP | 1 682 361 | | 7/2006 | |
| GB | 1124915 | * | 8/1968 | ............. B60C 11/00 |
| JP | 2009-107435 | * | 5/2009 | ............. B60C 11/00 |
| JP | 2009-154791 | * | 7/2009 | ............. B60C 11/00 |
| JP | 2010-105509 | * | 5/2010 | ............. B60C 11/00 |
| WO | WO 1999/037489 | | 7/1999 | |
| WO | WO 2010/072234 | * | 7/2010 | ............. B60C 11/04 |
| WO | WO 2010/137143 | | 12/2010 | |

OTHER PUBLICATIONS

JP 2009-154791, Jul. 2009, English language machine translation [www.epo.org].*
JP 2010-105509, May 2010, English language machine translation [www.epo.org].*

* cited by examiner

TIRE TREAD FOR HEAVY VEHICLE OF CONSTRUCTION PLANT TIRE

RELATED APPLICATIONS

This is a U.S. National Phase Application under 35 USC 371 of International Application PCT/EP2014/078367 filed on Dec. 18, 2014.

This application claims the priority of French application no. 1363135 filed Dec. 20, 2013, the entire content of which is hereby incorporated by reference.

FIELD OF THE INVENTION

The present invention relates to a tire for a heavy vehicle of heavy construction plant type and, more particularly, to the tread of such a tire.

Although not restricted to this type of application, the invention will be described more particularly with reference to a large-sized radial tire intended, for example, to be fitted to a heavy vehicle of the dumper type intended to transport materials extracted from quarries or open cast mines.

BACKGROUND OF THE INVENTION

In general, since a tire has a geometry exhibiting symmetry of revolution about an axis of rotation, the geometry of the tire can be described in a meridian plane containing the axis of rotation of the tire. In what follows, for a given meridian plane, the radial, axial and circumferential directions refer respectively to the directions perpendicular to the axis of rotation of the tire, parallel to the axis of rotation of the tire, and perpendicular to the meridian plane. In what follows, expressions "radially inside" and "radially outside" respectively mean "closer to the axis of rotation of the tire, in the radial direction" and "further from the axis of rotation of the tire, in the radial direction". The expressions "axially inside" and "axially outside" respectively mean "closer to the equatorial plane in the axial direction" and "further from the equatorial plane, in the axial direction", the equatorial plane being the plane perpendicular to the axis of rotation of the tire and passing through the middle of the tread surface of the tire.

The tread of the tire comprises raised elements separated by grooves. A raised element extends radially outwards from a bottom surface as far as a contact face, intended to come into contact with the ground when the tire is running, over a height H and comprises lateral faces. A groove is a cut in the tread, delimited laterally by lateral faces of raised elements facing one another and delimited radially towards the inside by a groove bottom resting on the bottom surface.

The tread of a tire comprises at least one first elastomer compound referred to as base compound.

An elastomeric compound is a material containing a diene elastomer of natural or synthetic rubber type, obtained by blending the various components of the material.

An elastomeric compound, after curing, can be mechanically characterized in particular by its elongation at break at 23° C. According to a first measurement method, the elongation at break is measured in accordance with French Standard NF T 40-101(December 1979), under uniaxial attention, on an "H2" test specimen 2.5 mm thick stretched until it breaks at a rate of 500 mm/min and at an ambient temperature of 23° C. According to a preferred second measurement method, the elongation at break is measured on a sample of elastomeric compound taken from the vulcanized tire. According to this second method, the sample taken is used to form a test specimen 18 mm long, 1.1 mm wide and 0.3 mm thick. The test specimen is taken from the tire in such a way that its length is perpendicular to the circumferential direction of the tire. This test specimen is then stretched on an extensometer at a rate of 50 mm/min at a temperature of 23° C. until it breaks. The elongation at break and the stress at break are recorded for at least two test specimens.

The tread of a tire needs to meet various performance requirements such as, by way of non-exhaustive examples, resistance to wear, resistance to mechanical attack, grip, rolling resistance. Because the raised elements and the grooves of the tread are subjected to different stress loadings, it is known practice of those skilled in the art that one way of differentiating these zones is to use elastomeric compounds which are specialized by zone.

Thus, it is known practise to use a second elastomeric compound, referred to as coating compound, superposed on the base compound and applied in particular to the lateral faces of the raised elements and to the bottoms of the grooves. Combining a base compound with a coating compound on the lateral faces and in the bottoms of grooves has been used, in the past, to achieve various objectives:

to improve grip, as described in documents EP 1499507, EP 1682360, EP 1682361, to reduce rolling resistance, as described in document WO 2010137143, to improve the ability of the groove bottoms to withstand cracking, as described in documents WO 1999037489, WO 2010072234.

The coating compound may be present not only on the lateral faces and the bottoms of the grooves but also on the contact faces of the raised elements, as described in documents U.S. Pat. No. 1,719,628 and WO 2010072234. It should be noted that those documents disclose a coating compound of constant thickness, covering the entirety of the tread.

SUMMARY OF THE INVENTION

One object of the present invention is to improve the ability of the groove bottoms of a tire tread for a heavy vehicle of construction plant type to withstand cracking.

This objective has been achieved in accordance with one aspect of the invention directed to a tire for a heavy vehicle of construction plant type, comprising:

a tread comprising raised elements separated by grooves, each raised element extending radially outwards from a bottom surface as far as a contact face over a height H and comprising lateral faces, each groove being a cut in the tread which cut is delimited laterally by lateral faces of raised elements that face one another and is delimited radially towards the inside by a groove bottom resting on the bottom surface, the tread comprising at least one first elastomeric compound, referred to as base compound, and at least one second elastomeric compound, referred to as painting compound, fully covering the base compound, the base compound and coating compound respectively having elongations at break at 23° C. $A_{R1}$ and $A_{R2}$, the coating compound having a constant maximum thickness $e_{max}$, at the contact face of each raised element, at most equal to 0.15 times the height H of the raised element, the coating compound having a constant minimum thickness $e_{min}$, at each groove bottom, at least equal to 0.04 times the height H of the raised element, and the elongation at break at 23° C. $A_{R2}$ of the coating compound being at least equal to 1.05 times the elongation at break at 23° C. $A_{R1}$ of the base compound.

According to an embodiment of the invention, the coating compound has a constant maximum thickness $e_{max}$, at the contact face of each raised element, at most equal to 0.15 times the height H of the raised element. This feature testifies to the fact that the thickness of the coating compound is at a maximum at the contact face and that, moreover, this maximum thickness has an upper limit An upper limit on the maximum thickness at the contact face ensures that the coating compound is a surface compound constituting a skin of limited thickness on the tread. Furthermore, this maximum thickness is constant across the entire contact face.

Again according to an embodiment of the invention, the coating compound has a constant minimum thickness $e_{min}$, at each groove bottom, at least equal to 0.04 times the height H of the raised element. This feature testifies to the fact that the thickness of the coating compound is at a minimum in the groove bottom, and more specifically in the centre of the groove bottom and that, moreover, this minimum thickness has a lower limit. A lower limit on this minimum thickness ensures a minimal presence of coating compound in the groove bottoms, needed for protecting the bottom of the groove against cracking.

As far as the variation in the thickness of the coating compound in the zone considered is concerned, the thickness of the coating compound, which is maximum and constant over the entire contact face, decreases in the lateral faces, until it reaches a minimum in the groove bottom.

The thicknesses of the coating compound and, in particular, the minimum and maximum thicknesses are measured on a cross section of an unworn new tire on a plane perpendicular to the axis of rotation of the tire. At a given point, the thickness of the coating compound is measured at right angles to the exterior surface of the tread. The height H, commonly referred to as the height of the tread pattern when new, is also measured on a cross section of tire.

According to an embodiment of the invention, the elongation at break at 23° C. $A_{R2}$ of the coating compound is at least equal to 1.05 times the elongation at break at 23° C. $A_{R1}$ of the base compound. This feature ensures that the elongation at break of the coating compound is high enough to allow the coating compound to absorb the deformations imposed on the groove bottom by the mechanical stresses applied to the tread during running, without the groove bottom cracking.

Advantageously, the minimum thickness $e_{min}$, of the coating compound at each groove bottom is at least equal to 1 mm Such a lower limit on the minimum thickness of the coating compound corresponds to a technological minimum as far as manufacture is concerned.

Advantageously also, the maximum thickness $e_{max}$ of the coating compound at the contact face of each raised element is at most equal to 10 mm. Such an upper limit on the maximum thickness of the coating compound makes it possible to limit the rise in temperature of the tread and therefore avoid impairing the endurance of the crown of the tire.

For preference, the elongation at break at 23° C. $A_{R2}$ of the coating compound (10) is at least equal to 1.08 times the elongation at break at 23° C. $A_{R1}$ of the base compound.

It is advantageous for the base compound to contain a diene elastomer of natural rubber type. The choice of natural rubber by way of diene elastomer for the base compound makes it possible to limit the rise in temperature of the tread, and therefore avoid impairing the endurance of the crown of the tire.

It is also advantageous for the coating compound to comprise a blend of diene elastomers of NR/SBR or NR/BR/SBR type, NR denoting a natural rubber, BR a polybutadiene and SBR a stirene-butadiene copolymer. By way of example, a blend of diene elastomers of the NR/SBR type may contain 20% Nr and 80% SBR. The choice of a blend of diene elastomers of NR/SBR or NR/BR/SBR type for the coating compound makes it possible to ensure good ability to resist cracking, particularly in the bottom of the groove.

BRIEF DESCRIPTION OF THE DRAWINGS

The features of the invention will be better understood with the aid of the description of the attached FIGS. 1 to 3 which have not been drawn to scale.

DETAILED DESCRIPTION OF THE DRAWINGS

Figure 1:
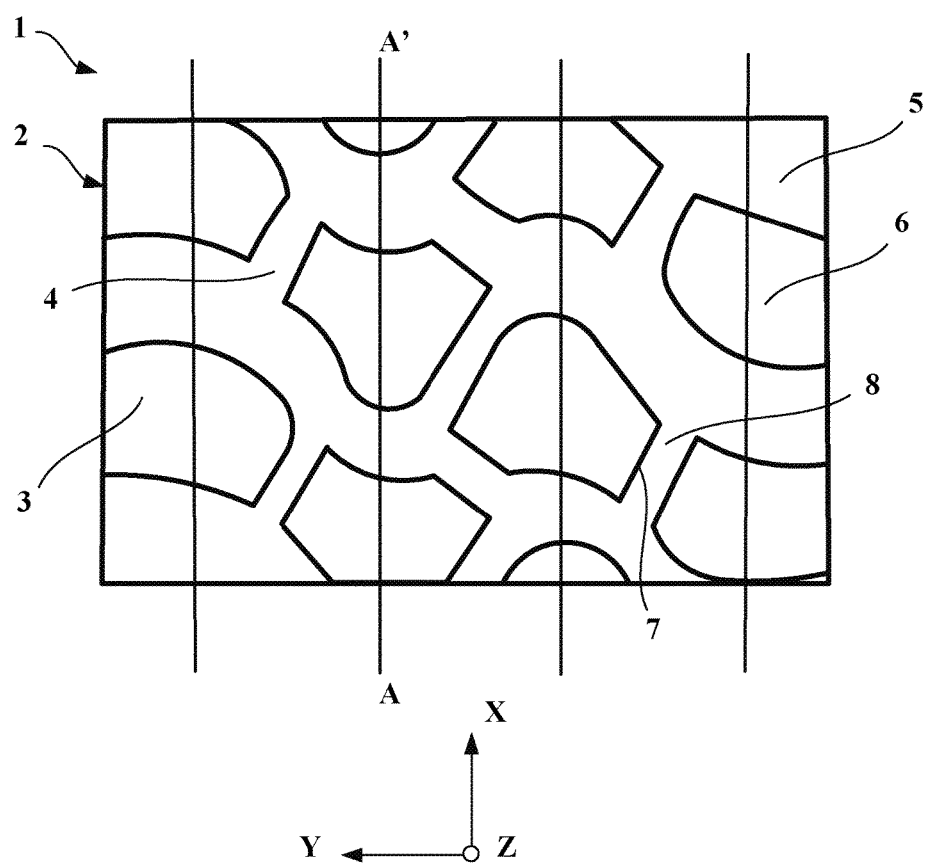
FIG. 1 is a view from above of a portion of tread for a tire for a heavy vehicle of construction plant type, according to an embodiment of the invention.

FIG. 1 depicts a plan view of a portion of tread 2 of a tire 1 for a heavy goods vehicle of construction plant type, according to the invention. The tread 2 comprises raised elements 3 separated by grooves 4. Each raised element 3 extends radially outwards from a bottom surface 5 as far as a contact face 6 over a height H—not depicted because it is perpendicular to the plane of the figure—and comprises lateral faces 7. Each groove 4 is a cut in the tread 2 which is delimited laterally by lateral faces 7 of raised elements 3 facing each other and delimited radially towards the inside by a groove bottom 8 resting on the bottom surface 5. Circumferential planes of section AA', parallel to the equatorial plane of the tire are also depicted, the equatorial plane being the plane perpendicular to the axis of rotation of the tire and passing through the middle of the tread.

Figure 2:
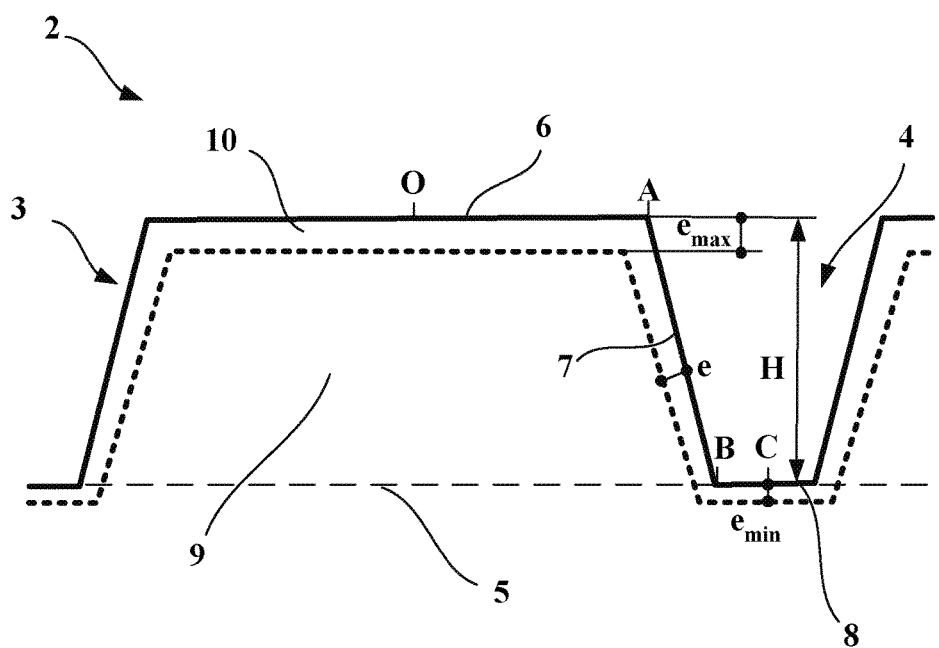
FIG. 2 is a view in section, on a plane perpendicular to the axis of rotation of the tire, of a portion of tire tread for a heavy vehicle of construction plant type, according to an embodiment of the invention.
Figure 2:
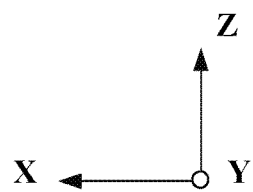

FIG. 2 depicts a view in section, on a plane of section AA' as depicted in FIG. 1, of a portion of tread of a tire for a heavy vehicle of construction plant type, according to the invention. In addition to showing the elements described in the case of FIG. 1, FIG. 2 shows that the tread 2 comprises a first elastomeric compound, referred to as base compound 9, which is the predominant component of the tread 2, and a second elastomeric compound, referred to as coating compound 10, fully covering the base compound 9, and which is a surface or skin component. FIG. 2 shows, in section, a raised element 3 comprising a contact face 6 and two lateral faces 7, the raised element 3 extending radially outwards from the bottom surface 5 (in dotted line) as far as the contact face 6. It also shows a groove 4, delimited axially by the respective lateral faces 7 of two raised elements 3 facing each other, and delimited radially on the inside by a groove bottom 8 positioned at the bottom surface 5. FIG. 2 in particular shows the variation in thickness e of the coating compound 10 according to the zone of tread. At the contact face 6, which has a middle O and an axial end A, the thickness of the coating compound 10 is constant and has a maximum value $e_{max}$, at most equal to 0.15 times the height H of the raised element 3. The maximum thickness $e_{max}$ is measured at the point O, the middle of the contact face 6. The thickness e of the coating compound 10 then decreases from the axial end A of the contact face 6, which coincides with the radially outer end of the lateral face 7, as far as the radially inner end B of the lateral face 7. Then, in the groove bottom 8, the thickness of the coating compound 10 is once against substantially constant and equal to a minimum value $e_{min}$ at least equal to 0.04 times the height H of the raised element 3. The minimum thickness $e_{min}$ is measured at the point C but is the middle of the groove bottom 8.

Figure 3:
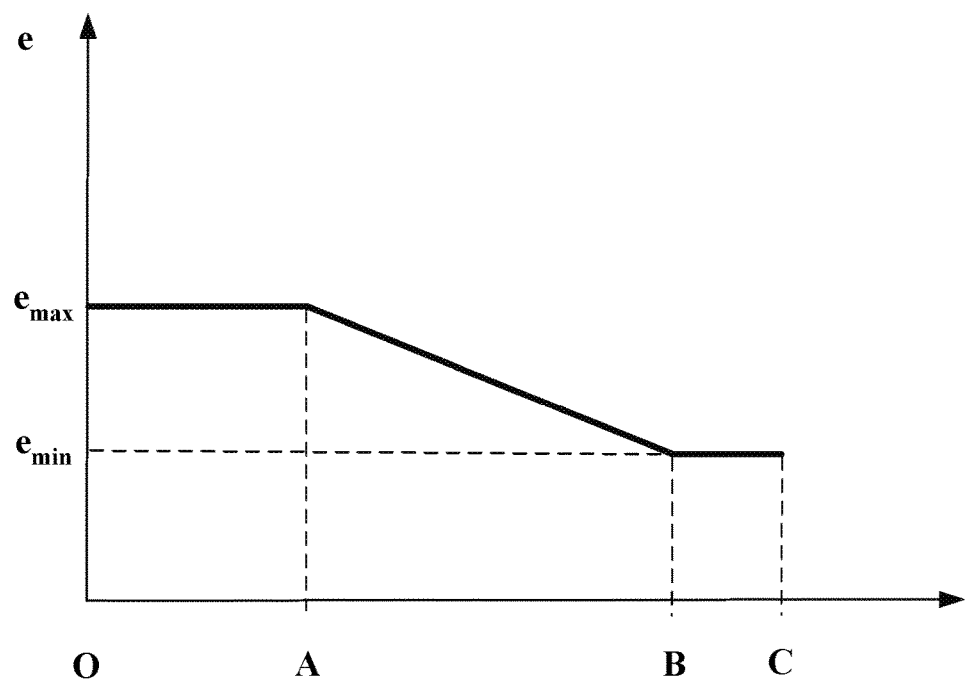
FIG. 3 is a graph depicting how the thickness of the coating compound evolves from the middle of a contact face to the middle of a groove bottom.

FIG. 3 is a graph showing how the thickness e of the coating compound 10 evolves from the middle O of a contact face 6 as far as the middle C of a groove bottom 8. As was seen earlier, the thickness e is constant and equal to the maximum value $e_{max}$ between the middle O and the axial end A of the contact face 6 then decreases from the axial end A of the contact face 6 as far as the radially inner end B of the lateral face 7 where it reaches a minimum value $e_{min}$, and remains constant and equal to this minimum value $e_{min}$ as far as the middle C of the groove bottom 8.

The invention has been studied in particular in the case of a 29.5R25 tire for an articulated dumper.

Thickness measurements were taken in two circumferential planes of section, positioned axially in a lateral portion of the tread near the edge of the tread, and in a central portion of the tread, respectively. The results obtained are collated in table A below:

TABLE A

| H = 40 mm | $e_{max}$ (mm) | $e_{min}$ (mm) | $e_{max}$/H | $e_{min}$/H |
|---|---|---|---|---|
| Plane of section lateral portion | 4 | 2.5 | 0.10 | 0.06 |
| Plane of section central portion | 4.5 | 2 | 0.11 | 0.05 |

Elongation at break measurements were taken on samples taken from the tire, from the coating compound and from the base compound respectively, in the form of test specimens measuring 18 mm long, 1.1 mm wide and 0 3 mm thick, subjected to uniaxial tension until the point of breaking, at a rate of 50 mm/min and at a temperature of 23° C. For each of the elastomeric compounds, the elongations at break and the stress at break are the averages of results obtained over at least two test specimens.

The results obtained are given in table B below:

TABLE B

|  | Coating compound | Base compound | Ratio |
|---|---|---|---|
| Mean elongation at break at 23° C. (%) | 814 | 752 | 1.08 |
| Mean stress at break at 23° C. (MPa) | 21.7 | 24.6 | 0.88 |

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy vehicle of construction plant type, comprising:
    a tread comprising raised elements separated by grooves;
    each raised element extending radially outwards from a bottom surface as far as a contact face over a height H and comprising lateral faces;
    each said groove being a cut in the tread which cut is delimited laterally by lateral faces of raised elements that face one another and is delimited radially towards the inside by a groove bottom resting on the bottom surface;
    the tread comprising a base compound comprising at least one first elastomeric compound, and a coating compound comprising at least one second elastomeric compound, the coating compound fully covering the base compound;
    the base compound and coating compound respectively having elongations at break at 23° C. $A_{R1}$ and $A_{R2}$;
    wherein the coating compound has a constant maximum thickness $e_{max}$, at the contact face of each raised element, at most equal to 0.15 times the height H of the raised element,
    wherein the coating compound has a constant minimum thickness $e_{min}$, at each groove bottom, at least equal to 0.04 times the height H of the raised element,
    wherein the constant maximum thickness $e_{max}$, at the contact face is greater than the constant minimum thickness $e_{min}$ at each groove bottom, and
    wherein the elongation at break at 23° C. $A_{R2}$ of the coating compound is at least equal to 1. 05 times the elongation at break at 23° C. $A_{R1}$ of the base compound.

2. The tire for a heavy vehicle of construction plant type according to claim 1, wherein the minimum thickness $e_{min}$ of the coating compound at each groove bottom is at least equal to 1 mm.

3. The tire for a heavy vehicle of construction plant type according to claim 1, wherein the maximum thickness $e_{max}$ of the coating compound at the contact face of each raised element is at most equal to 10 mm.

4. The tire for a heavy vehicle of construction plant type according to claim 1, wherein the elongation at break at 23° C. $A_{R2}$ of the coating compound is at least equal to 1.08 times the elongation at break at 23° C. $A_{R1}$ of the base compound.

5. The tire for a heavy vehicle of construction plant type according to claim 1, wherein the base compound contains a diene elastomer of natural rubber (NR) type.

6. The tire for a heavy vehicle of construction plant type according to claim 1, wherein the coating compound comprises a blend of diene elastomers of NR/SBR or NR/BR/SBR type, NR denoting a natural rubber, BR a polybutadiene and SBR a stirene-butadiene copolymer.

7. The tire for a heavy vehicle of construction plant type according to claim 1, wherein the thickness of the coating compound on the lateral faces decreases from the contact face to each groove bottom.

* * * * *